United States Patent [19]

Henriksson

[11] 3,785,806

[45] Jan. 15, 1974

[54] METHOD OF PRODUCING ARSENIC SELENIDES AND ARSENIC DOPED SELENIUM

[75] Inventor: Sten Tycho Henriksson, Skelleftehamn, Sweden

[73] Assignee: Boliden Aktiebolag, Stockholm, Sweden

[22] Filed: Feb. 28, 1972

[21] Appl. No.: 229,956

[30] Foreign Application Priority Data
Mar. 12, 1971 Sweden.............................. 3226/71

[52] U.S. Cl. ................. 75/134 H, 75/134 P, 96/1.5
[51] Int. Cl. ............................................. C22c 1/10
[58] Field of Search ..................... 75/134 H, 134 P; 96/1.5

[56] References Cited
UNITED STATES PATENTS
2,803,542  8/1957  Ullrich ...................................... 96/1
3,615,413  10/1971  Fisher ................................... 96/1.5

*Primary Examiner*—L. Dewayne Rutledge
*Assistant Examiner*—E. L. Weise
*Attorney*—Stevens, Davis, Miller & Mosher

[57] ABSTRACT

A process for producing arsenic doped selenium. Finely divided selenium is mixed with a finely divided arsenic in an atomic ratio of 1:4, whereafter the mixture is heated in an inert atmosphere to obtain a master alloy. The master alloy is then mixed with molten pure selenium in a manner to obtain an arsenic content of between 0.1 and 2 percent by weight in the selenium.

7 Claims, 1 Drawing Figure

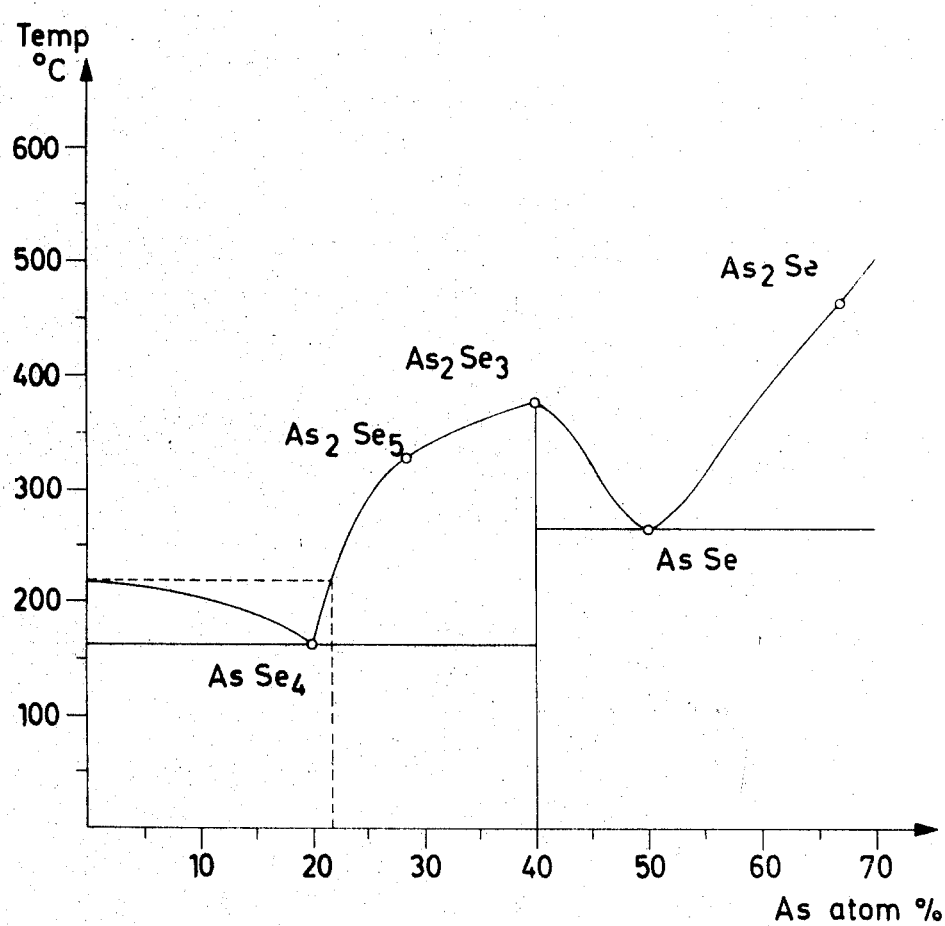

METHOD OF PRODUCING ARSENIC SELENIDES AND ARSENIC DOPED SELENIUM

The present invention relates to a method of producing arsenic doped selenium containing 0.1 – 2 percent by weight arsenic.

Selenium is used, among other things, for photoelectrical purposes and it is known that the properties of selenium can be improved for such purposes by dissolving slight quantities of arsenic therein. The quantity of arsenic in the selenium in this respect normally amounts to some tenths of a percent. Such arsenic containing selenium alloys are found described in the U.S. Pat. Nos. 2,803,542 and 2,822,300 and Dessaner-Clark "Xerography and Related Processes," pages 79, 80 and 108, London-New York (1965). The arsenic and selenium used must have a high degree of purity and must be of high quality. The arsenic is dissolved in the selenium by heating a powderous mixture of arsenic and selenium, the selenium melting first and the arsenic gradually dissolving therein, although not completely. The operation can be effected in an open or a closed vessel. These known methods have the disadvantage that the arsenic is incompletely dissolved in the selenium, and undefined compounds are formed between selenium and arsenic. Moreover, it is difficult to adjust the content of arsenic exactly to a specific level, and neither is it possible to obtain with a selenium treated in this manner the properties required with respect to its photoelectrical and crystallisation inhibiting effects. Arsenic dissolves very slowly in molten selenium, even when the arsenic is very finely pulversized. In practice a complete dissolution of the arsenic is not obtained and a portion of the arsenic remains on the bottom of the vessel undissolved. (See for example U.S. Pat. No. 2,803,542, column 2, lines 32–35).

When the reaction between selenium and arsenic begins, the arsenic exists in solid phase, for example in the form of fine particles suspended in the molten selenium. An excess of arsenic is therefore found in the phase interface, which is the reaction zone. From a thermo-dynamical and reaction kinetic point of view this means that there exists a preference for forming arsenic selenides having a relatively high ratio of As to Se. The constitutional diagram for the system As–Se is illustrated in the figure, and shows that while there is found a plurality of arsenic selenides possessing highly varying melting points the melting point for most of the arsenic selenides lies above the melting point of selenium. Thus, when powdered metallic arsenic is added to molten selenium, the result in practice is that lumps of different arsenic selenides are obtained, which float around in the selenium. These lumps have varying composition, but the ratio of arsenic to selenium is so high that the melting points are higher than the melting point of pure selenium. Thus, it is not possible to dissolve the lumps of arsenic selenides and obtain a homogeneous melt without raising the working temperature far above the melting point of selenium. In practice, heating of the arsenic selenide lumps to such temperatures would give rise to difficulties in the form of vaporisation and selenium losses etc. and hence the treatment process must be effected in a closed system under pressure.

Instead of mixing pure arsenic directly with selenium, the present invention is based on the concept of mixing therewith an arsenic selenide having a melting point which is lower than the melting point of selenium. As will be evident from the accompanying drawing, which shows the constitutional diagram for arsenic and selenium, this is only applicable to a relatively small area, up to approximately 23 percent by weight As. The compound $AsSe_4$, corresponding to the eutectic composition (approximately 19 percent by weight As and 81 percent by weight Se), has the lowest melting temperature, approximately 150° C. When $AsSe_4$ is introduced into molten selenium it melts therein so that two fully miscible liquids are obtained. The arsenic tetra selenide is readily soluble in the liquid selenium and it is possible in this manner to dope the selenium homogeneously with arsenic. The temperatures applied in practice are slightly higher than the melting point of the selenium, rising to approximately 260° C, in order to increase the solubility rate and to obtain a lower viscosity of the liquids. Higher temperatures should not be used, since resulting vaporisation creates problems.

The invention also relates to a method for producing arsenic tetra-selenide for the aforementioned purposes. It has been discovered that certain conditions must be observed in order for arsenic and selenium to react to form the desired selenide. According to the method of the present invention, there is melted a powdered mixture of arsenic and selenium. It is extremely important that the powderous mixture is homogeneous and that the arsenic and selenium have been comminuted to the greatest possible extent. In this way it is possible to avoid local disproportioning and the formation of other selenides. The particle size of the two components should be less than $30\mu m$ and preferably $5-10\mu m$. It is also important that the two components are pure and do not contain reaction inhibiting contaminants, such as protective oxide skins. This is particularly applicable to the powdered metallic arsenic, which can be readily oxidized and introduces high contents of oxygen into the selenide and the arsenic-doped selenium obtained as the end product. The best results have been obtained when using highly pure crystalline elementary arsenic ground in a closed agate mill in a protective environment such as an argon gas atmosphere. Similarly, the selenium should also be as pure as possible and is preferably ground in the same manner as the arsenic. The degree of purity should correspond to 99.999 percent Se or higher (i.e., the sum of impurities should be less than 10 g/t). When proceeding in accordance with the invention, the powdered mixture is heated slowly, whereupon a reaction can be clearly observed within the interval 150°–200° C. As $AsSe_4$ is formed it melts and the entire mixture is gradually transformed to a sluggish, black liquid having a bright, highly reflective surface. No solid aggregates of other high-temperature melting-selenides are found. The reaction can be effected in many ways within the concept of the invention, and in the following is given an example of a method, which has been found well suited for performing the reaction in question. In accordance with this method, a glass ampule is filled with the powderous mixture under a protective gas atmosphere, such as argon, whereafter the ampule is heat sealed. The ampule is then placed in a temperature controlled furnace or heating cabinet and attached in a rotatable holder means located therein. The temperature in the cabinet is first set to 150°–200° C. A reaction time of 24 hours is suitable for a quantity of the order of 500 g. When the reaction has terminated, the temperature of the cabinet is raised around 400° C and the ampule rotated slowly at about one revolution per minute. The selenide is then of low viscosity and, owing to the agitation, the liquid becomes fully homogenized. This stage of the treatment process also takes roughly 24 hours, after which time the ampule is removed and rapidly cooled in air while held in a vertical position. In this way a coherent cylindrical stick of $AsSe_4$ is obtained in the ampule. When solidifying, the stick loosens from the glass and can be readily removed from the ampule.

The invention also relates to a process for producing arsenic doped selenium which is distinguished by the fact that it is particularly free of oxygen. This is important, since the selenium shall be used for photoelectrical purposes, with which even small quantities of oxygen are liable to disturb the process. The object is to produce arsenic doped selenium having an oxygen content smaller than some 3 grams per ton. The introduction of oxygen into the selenium when working with arsenic is extremely liable, however. It is true that metallic arsenic can be made free of oxygen by sublimating the same in hydrogen gas, but the arsenic partially oxidizes in air, especially moist air, and particularly when it is finely ground. When oxidized, the metal particles become coated with a thin film of oxide, and amorphous arsenic, whereafter the particles stop taking up oxygen. Thus, it is extremely difficult to grind the metal and to handle same during the selenium doping process without allowing the material, at some time or other, to come into contact with oxygen air. Selenium, on the other hand, has no great tendency to absorb oxygen and it is relatively simple when applying known methods to remove small quantities of oxygen from selenium, e.g., by passing atomized hydrogen gas through a selenium melt. In this way it is possible to obtain oxygen contents lower than approximately 0.5g/ton.

It is, however, difficult to work with an oxygen free arsenic for the direct manufacture of an arsenic doped selenium having a low oxygen content. On the other hand, if $AsSe_4$ is used to dope the selenium instead of arsenic the problems can be resolved more simply. It is true that oxygen will accompany the metal even when the selenide is manufactured, but the oxygen becomes bound in the $AsSe_4$ melt in a manner which renders it relatively easy to remove. The special oxygen cleansing process is effected subsequent to producing the selenide and whilst it is still in a molten state. The selenide is completely safe for oxygen after it has been cooled to a solid condition. It can therefore be ground and handled in connection with doping the selenium without the risk of absorbing oxygen. Oxygen contents of 5 grams per ton and lower in the selenide can easily be obtained by purification.

The oxygen addition supplied to the As doped selenium via purified $AsSe_4$ is negligible. A highly pure selenium having approximately 0.5 grams of oxygen per ton can be used for producing an As doped selenium of good quality having 0.5 percent As. 5kg As per ton, corresponding to approximately 25 kg $AsSe_4$, is required for the doping operation. Subsequent to being purified, the $AsSe_4$ contains approximately 5 grams of oxygen per ton, and hence the amount of oxygen added from $AsSe_4$ to the doped selenium is of the order of 0.1 g/ton, as compared with 0.5 g/ton from the selenium. The final content of oxygen in the doped selenium is thus of the order of one half gram per ton. If no special measures are taken to purify the metal or the selenide, it is extremely normal to obtain oxygen contents in the doped selenium of between 5 and 10 grams per ton. When present at such levels, oxygen may impair the photoelectrical properties of the selenium.

Selenium can be doped with arsenic selenide in the following manner: A quartz bowl provided with an agitator is first charged with a bottom layer of granulated pure selenium, on which is placed $AsSe_4$, the remaining selenium being placed on top of the $AsSe_4$. The selenide can be present in a finely divided form, such as in powder form or in the form of the coherent cylindrical stick obtained from the aforementioned glass ampule. The bowl is suitably provided with a lid and means for introducing thereto a protective gas, such as argon or nitrogen. The quartz bowl is heated slowly in an electric furnace. When the temperature exceeds 150° C., the selenide is observed to melt and run down into the granulated selenium. The temperature is then raised progressively, and when the selenium melt is complete, at about 260° C, the selenide is observed to rapidly dissolve. The mixture is then agitated for some hours, causing the As to be distributed homogeneously in the selenium. It is also possible to add the selenide in liquid form to the selenium, either in a molten or a solid state. In this case, however, there are generally some risks of the mixture becoming contaminated. A fourth method is to add the solid arsenide master alloy to molten selenium as previously described. The selenium is normally granulated to a coarse particle size of some millimeters in diameter, by allowing the melt to run in a fine jet into cold water. In certain instances the use of water granulating methods is estimated less suitable, since the risk is present of water inclusions being transferred to the selenium. Moreover, the selenium is liable to absorb some oxygen. Arsenic will be dissolved out in the granulating water, although to a very small extent. Instead, the selenium can be granulated on a cold moving surface, e.g., on a so-called chilling roll. A chilling roll may comprise, for example, a double-shell drum which is chilled with cold water and provided with an outer cylindrical surface of oxygen proof steel. The surface should be extremely smooth and suitably highly polished. The liquid selenium is transferred from a special distribution container located above the drum. A number of rods are arranged through the bottom of the container, along which rods the selenium is permitted to run to form droplets of the desired size at the ends thereof. These droplets then fall down onto the chilled surface and form thereon flattened, lens shaped granules having a diameter of approximately 5 mm and a thickness of approximately 1 mm. The arrangement should also be shielded in a protective gas atmosphere so that, while in a molten state, the selenium is shielded from contact with air oxygen.

The doped amorphous selenium with As in solid solution and possessing but low oxygen contents provides the best quality properties for electrophotography. Such a selenium can be obtained by doping with the aforedescribed compound $AsSe_4$ produced from highly pure components and particularly purified of oxygen. It is not possible to obtain a homogeneously doped oxygen free As-Se solution directly from As and Se or via an underfined mixture of all possible arsenic selenides.

What is claimed is:

1. A process for producing arsenic-doped selenium containing between 0.1 and 2 percent by weight of arsenic which comprises, mixing finely divided selenium and finely-divided arsenic with a grain size of at most 30μm and an atomic mixing ration of arsenic to selenium equal to substantially 1:4, heating said mixture in an inert atmosphere to a temperature above 150° C to form a homogeneous master alloy comprising substantially arsenic tetraselenide, forming a melt containing said master alloy and pure selenium in such proportions that said arsenic content is obtained.

2. A method according to claim 1, wherein arsenic-tetra selenide is purified of oxygen prior to the doping of the selenium.

3. A method according to claim 1, wherein prior to doping the selenium with arsenic, the arsenic tetra selenide has a content of oxygen less than 5 grams per ton.

4. The process as set forth in claim 1 wherein the melt is formed by mixing the master alloy in solid form with a melt of pure selenium.

5. The process as set forth in claim 1 wherein the melt is formed by mixing the master alloy in liquid form with a melt of pure selenium.

6. The process as set forth in claim 1 wherein the melt is formed by mixing the master alloy in solid form with the pure selenium in solid form and then melting the resulting mixture.

7. The process as set forth in claim 1 wherein the melt is formed by mixing the master alloy in liquid form with the pure selenium in solid form and heating the resulting mixture.

* * * * *